Patented May 6, 1930

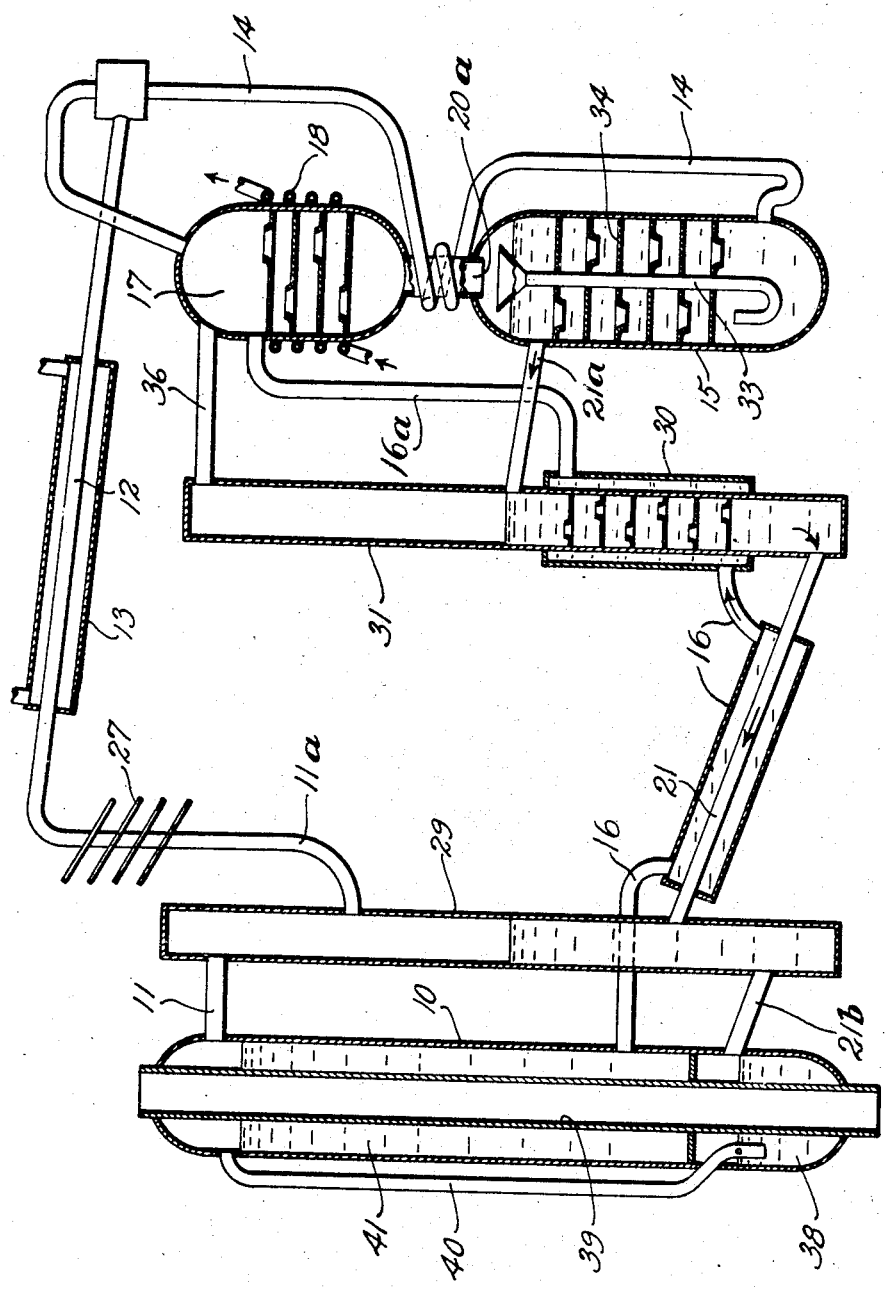

1,757,254

UNITED STATES PATENT OFFICE

ALVAR LENNING, OF NEW YORK, N. Y., ASSIGNOR TO ELECTROLUX SERVEL CORPORATION, OF NEW YORK, N. Y., A CORPORATION OF DELAWARE

REFRIGERATION

Application filed May 21, 1929. Serial No. 364,788.

My invention relates to refrigeration and has for an object to provide a simple and stable system of the type wherein a fluid is expelled from solution in a second fluid in the evaporator by the introduction of a third fluid into the evaporator.

Another object of the invention is to provide a novel refrigerating system without moving parts and in which the evaporator can be situated lower than the other parts of the system.

Further objects and the advantages of the present invention will be apparent from the following description taken in conjunction with the accompanying drawings showing diagrammatically refrigerating systems embodying my invention of which:

Fig. 3 shows another embodiment of the invention.

Figure 1:
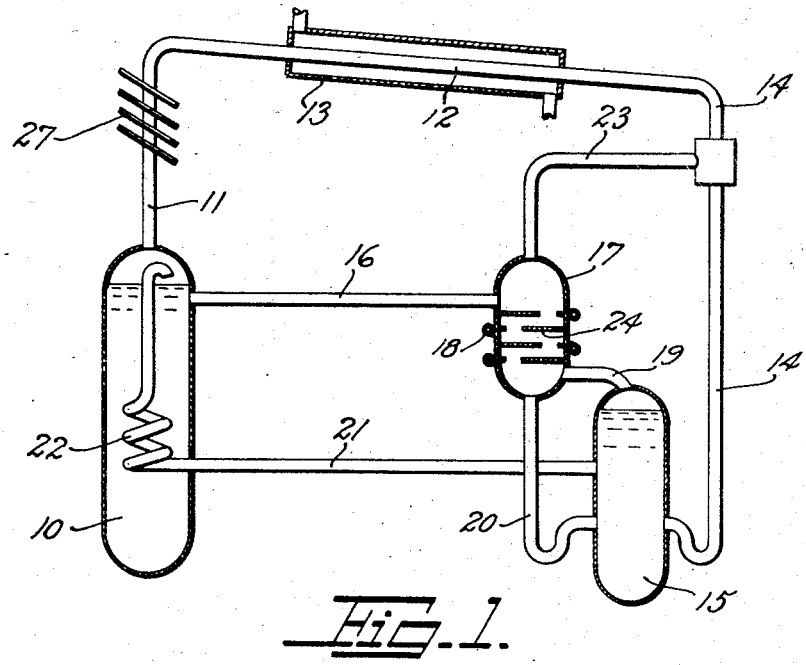
Fig. 1 is a simplified diagrammatic showing of a refrigerating system embodying the invention.

The system of apparatus according to the invention contains a first fluid herein called the expeller fluid, a second fluid in which the first fluid is soluble herein called the solvent, and a third fluid soluble in the second fluid but not in the first fluid herein called the refrigerant. In describing the systems shown in the drawings, I will select for purposes of illustration diethylamine as the expeller fluid, water as the solvent and ammonia as the refrigerant, it being understood, however, that other combinations of fluids may be used so long as they have the relative solubilities above outlined and are capable of existing in the proper conditions within the system which conditions will be hereinafter pointed out.

In Fig. 1 reference character 10 designates a generator which may be heated in any suitable way as by a gas flame or by an electric heating element. The generator contains a solution of diethylamine in water. Diethylamine has a lower boiling point than water and is expelled from solution in the water in the generator. Diethylamine vapor passes through conduit 11 in which is interposed a rectifier 27 and into a condenser 12 which may be cooled in any suitable way as by a water jacket 13 or by air. In condenser 12 the vapor is condensed into liquid and the liquid runs through conduit 14 into evaporator 15.

The water from which the diethylamine has been driven off passes through conduit 16 and into absorber 17. Absorber 17 is suitably cooled as by a coil 18 carrying running water. Absorber 17 is also supplied with ammonia gas through conduit 19 connecting the absorber with the upper part of evaporator 15. In absorber 17 a solution of ammonia in water is formed. Absorber 17 is arranged at a higher level than evaporator 15 and the solution of ammonia in water flows through conduit 20 and into evaporator 15. The absorber contains trays 24 over which the water cascades downwardly.

In the evaporator the diethylamine entering through conduit 14 forms a solution with the water thereby liberating more or less of the ammonia. This ammonia becomes gaseous and in so doing takes up heat from the surroundings thus producing refrigeration. The gaseous ammonia flows through conduit 19 to the absorber to be again absorbed and thus reduced to the liquid phase.

The solution of diethylamine and water reformed in the evaporator passes through conduit 21 and through a thermo-siphon device 22 and into generator 10. The purpose of the thermo-siphon is to lift the liquid to permit a higher level in the generator than in the absorber-evaporator cycle so that liquid may flow by gravity from the generator to the absorber through conduit 16.

An equalizing pipe 23 is provided connecting the upper part of absorber 17 with the higher portion of conduit 14.

The present system is based on the quasi-chemical interaction of two bases of different strengths and a weak acid or fluids acting as such. The expeller is the stronger base; the refrigerant is the weaker base; and the solvent is the weak acid. In the example above described, the strong base is the diethylamine; the weaker base is the ammonia and the water acts as a weak acid in the presence of the two bases. One of the two bases must be stronger than the other. Diethylamine is a much stronger base than ammonia. Consequently it has a higher tendency to unite with water than has ammonia. The latent heat of vaporization of ammonia is much higher than the latent heat of vaporization of diethylamine. In either case the latent heat of vaporization is much greater than the heat of solution in water for operating conditions in the evaporator. If diethylamine is added to a solution of ammonia in water, ammonia gas is liberated and a cooling effect results. The amount of cold generated is equal to the sum of the latent heat of vaporization of the ammonia plus the heat of solution of ammonia in water minus the heat of solution of diethylamine in water. The reason why the displacement of the ammonia by the diethylamine takes place is that the heat of solution of diethylamine in water is greater than the heat of solution of ammonia in water. However, the difference is not large enough to offset the latent heat of vaporization of the ammonia, wherefore the net result will be a cooling effect. Obviously the greater the heat of vaporization is with reference to the difference between the heats of solution, the greater will be the cooling effect per unit weight of refrigerant liquid.

Instead of using two bases and one weak acid, a system of this type may employ two acids and one weak base.

Figure 2:
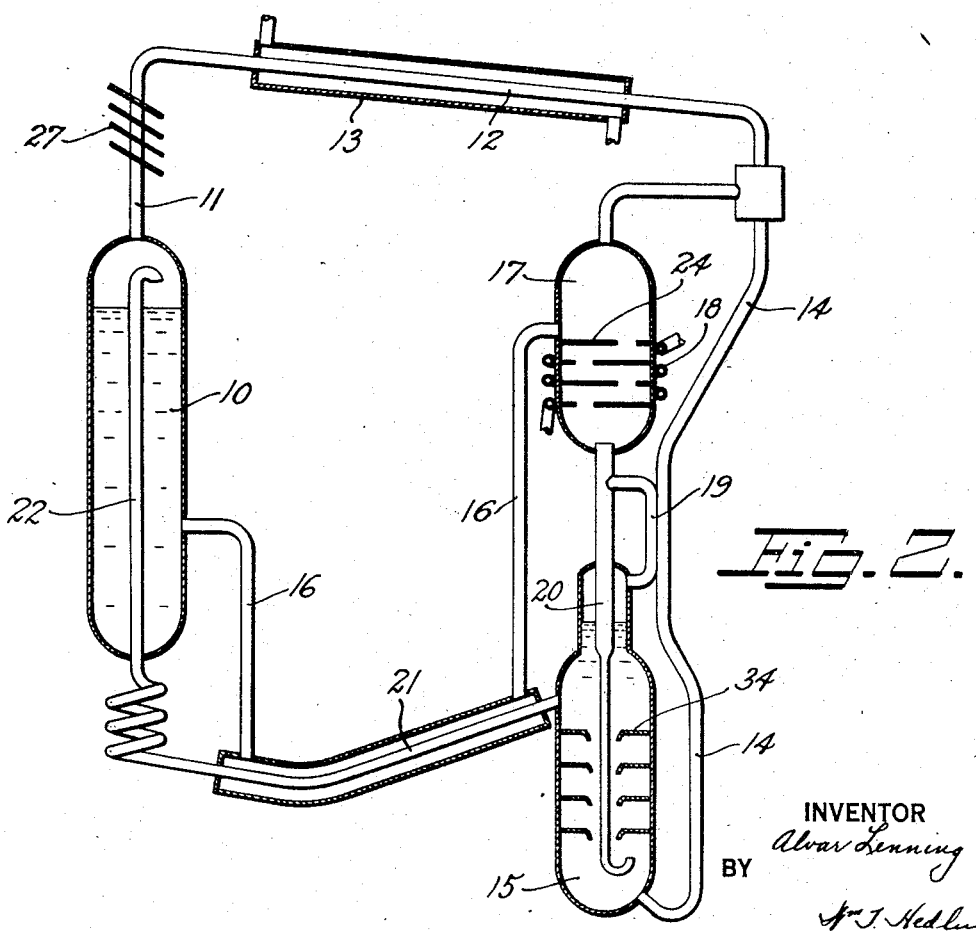
Fig. 2 shows the system equipped with heat exchangers and other details.

The arrangement shown in Fig. 2 may contain the same fluids as in Fig. 1. Like reference characters designate like parts in the two figures. Conduit 16 and conduit 21 are arranged in heat exchange relation in order to cool warm liquid leaving the generator through conduit 16 by the cool liquid leaving the evaporator. Conduit 14 is arranged in heat exchange relation with conduit 19 in order to transfer cold from the fluid leaving the evaporator 15 into the fluid in conduit 14 entering the evaporator. Trays or disks 24 and 34 may be provided in the absorber and evaporator in order to obtain more intimate contact of the fluids. Trays 34 in the evaporator are formed with turned down edges around the apertures in the same to give liquid surfaces for release of gas. The upper part of the evaporator in Fig. 2 acts as a gas separator. The liquid will substantially fill the evaporator whereas the absorber carries liquid only on trays 24.

It will be obvious that the parts may be arranged in a number of ways and that such devices as the heat exchangers may be made in a number of forms. Auxiliary devices may be added to the system to improve the efficiency.

The system is hermetically sealed and operates at the same pressure throughout except for differences in pressure due to any heights of liquids. Force for circulation of fluid is generated within the system. Circulation between the absorber and evaporator is produced by differences of specific gravity. Circulation between the generator and the absorber-evaporator cycle is produced due to changes in specific gravity caused by the thermo-siphon member 22. The formation of gas in the generator and condensation in the condenser 12 causes the flow of the vapor of the expeller from the generator through the condenser and to the evaporator.

Other combinations of fluids which may be used in this system are: (1) ethylamine, water and ammonia; and (2) diethylamine, boric acid dissolved in water, and methylamine. In each of these groups the first mentioned is the expeller, the second mentioned is the refrigerant and the third mentioned is the solvent. In each case the expeller has a lower boiling point than the solvent and both the expeller and the solvent have a higher boiling point than that of the refrigerant.

The system shown in Fig. 3 is similar to that of Fig. 2, differing in showing additional parts for obtaining higher efficiency. Like characters in the various figures designate corresponding parts.

Considering the same fluids as being used in Fig. 3 as in Fig. 1, diethylamine vapor is driven off in the generator and passes through conduit 11 into a vertical separator 29, whence it passes through conduit 11$^a$, in which rectifier 27 is interposed, and into condenser 12. Liquid diethylamine flows through conduit 14 into the evaporator as in the apparatus of Fig. 2.

Water, weak in diethylamine, leaves the generator through conduit 16, passes through a jacket 30 surrounding a vertical separator 31 and thence through conduit 16$^a$ into the upper part of the absorber 17. Liquid flows down from the absorber into the evaporator through conduit 20$^a$. Conduit 20$^a$ is of relatively large size and also conducts gaseous ammonia upwardly to the absorber. A tube 33 receives the solution passing downwardly through conduit 20$^a$ and conducts it to the lower part of the evaporator.

The diethylamine solution leaves the evaporator through conduit 21$^a$ and passes into separator 31. In separator 31 further ammonia is given off due to its temperature being higher than that of the evaporator. The ammonia liberated in separator 31 passes through conduit 36 into the absorber.

The diethylamine solution passes through conduit 21 where it is heated by the warm liquid in conduit 16. This drives some diethylamine out of solution. This diethylamine vapor passes up in separator 29 and into conduit 11ª. From separator 29, diethylamine solution passes through conduit 21ᵇ into thermo-siphon chamber 38 which is heated by a heating source projected into flue 39. The solution is lifted through siphon pipe 40 into the main generator chamber 41 also heated by flue 39.

In the various embodiments the evaporator or a part thereof can be situated below the remaining parts which facilitates mounting the refrigerator on the top of a cabinet.

What I claim is:

1. Refrigerating apparatus comprising, in combination, a condenser, an absorber, an evaporator, means to supply the evaporator with a solution from the absorber and a condensed fluid from the condenser, means to conduct vapor from the evaporator to the absorber and means for receiving solution from the evaporator, separating the same and conducting gaseous fluid to the condenser and liquid to the absorber.

2. The process of producing refrigeration by the aid of an absorption system including a generator, a condenser, an absorber and an evaporator which comprises expelling a first fluid from solution in a second fluid in the generator, conducting the first fluid to the condenser and liquefying the same, conducting the second fluid into the presence of a third fluid in gaseous form in the absorber thereby forming a solution, conducting the last-mentioned solution to the evaporator, conducting the liquefied first fluid to the evaporator to recombine the first and second fluids and liberate the third fluid as a gas, returning the gaseous third fluid to the absorber and returning the recombined first and second fluids to the generator.

3. Refrigerating apparatus comprising a generator, a condenser, an absorber, an evaporator, said absorber being situated at a higher level than the evaporator, means to conduct vapor from the generator to the condenser, means to conduct liquid from the condenser to the evaporator, means to conduct liquid from the generator to the absorber, means to conduct liquid from the absorber to the evaporator and means to conduct liquid from the evaporator to the generator.

4. Refrigerating apparatus comprising a generator, a condenser, an evaporator, a connection for flow of liquid from said generator to said evaporator, an absorber interposed in said connection, a connection for flow of gaseous fluid from said generator to said condenser, a connection for flow of liquid from said condenser to said evaporator, means to conduct liquid from said evaporator to said generator and means to conduct vapor from said evaporator to said absorber.

5. That improvement in the art of refrigerating through the agency of an absorption system including a generator, a condenser, an absorber and an evaporator which consists in conducting fluid from both the generator and the evaporator to the absorber, forming a solution in the absorber, conducting fluid from both the absorber and the condenser to the evaporator, conducting liquid from the evaporator to the generator and conducting gas from the generator to the condenser.

6. That improvement in the art of refrigeration through the agency of an absorption system including a generator, a condenser, an absorber and an evaporator which consists in conducting fluid from both the generator and the evaporator to the absorber, forming a solution in the absorber, conducting fluid from both the absorber and the condenser to the evaporator, conducting liquid from the evaporator to the generator, conducting gas from the generator to the condenser and circulating fluids within the system due to force generated within the system.

7. That improvement in the art of refrigeration through the agency of an absorption system including a generator, a condenser, an absorber and an evaporator which consists in conducting fluid from both the generator and the evaporator to the absorber, forming a solution in the absorber, conducting fluid from both the absorber and the condenser to the evaporator, conducting liquid from the evaporator to the generator, conducting gas from the generator to the condenser and circulating the fluids within the system due to force generated within the system while maintaining a substantially constant pressure throughout the system.

8. The process of producing refrigeration by the aid of an absorption system including a generator, a condenser, an absorber and an evaporator which comprises expelling diethylamine from solution in water, conducting the diethylamine vapor to the condenser and condensing the vapor to liquid, conducting the water into the presence of gaseous ammonia in the absorber thereby forming a solution, conducting the solution of ammonia and water to the evaporator, conducting the liquid diethylamine to the evaporator to form a solution with the water and thereby liberating gaseous ammonia, returning the gaseous ammonia to the absorber and returning the diethylamine and water solution to the generator.

9. Refrigerating apparatus comprising a generator, a first separator, a vapor connection between the upper part of the generator and the upper part of said separator, a condenser connected to the upper part of said separator, an evaporator, an absorber situated above the evaporator, a connection between the condenser and the evaporator, a connection between the absorber and the evaporator, a second separator, means to conduct liquid from the evaporator to the second separator, a connection between said second separator and said absorber, a connection between the lower part of the first separator and the generator, a connection between the separators and means to conduct liquid from the generator, in heat exchange relation with the last-mentioned connection, in heat exchange relation with the second separator and into the absorber.

In testimony whereof I have affixed my signature.

ALVAR LENNING.